(12) United States Patent
Shin et al.

(10) Patent No.: US 7,677,942 B2
(45) Date of Patent: Mar. 16, 2010

(54) METHOD OF MAKING A PLASMA DISPLAY PANEL AND GREEN SHEET FOR FORMING DIELECTRIC LAYERS OF THE PLASMA DISPLAY PANEL

(75) Inventors: Hyea-Weon Shin, Kyunggi-do (KR); Jeong-Nam Kim, Kyunggi-do (KR); Yong-Shik Hwang, Kyunggi-do (KR); Myoung-Sup Kim, Kyunggi-do (KR); Young-Do Choi, Kyunggi-do (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 502 days.

(21) Appl. No.: 11/529,398

(22) Filed: Sep. 29, 2006

(65) Prior Publication Data

US 2007/0082575 A1  Apr. 12, 2007

(30) Foreign Application Priority Data

Oct. 7, 2005 (KR) .................... 10-2005-0094251

(51) Int. Cl.
*H01J 9/00* (2006.01)
(52) U.S. Cl. ......................... 445/24; 445/25
(58) Field of Classification Search ............. 445/24, 445/25; 313/582–587; 430/270, 311; 438/26, 438/622
See application file for complete search history.

(56) References Cited

U.S. PATENT DOCUMENTS

| 5,541,618 | A | 7/1996 | Shinoda |
| 5,661,500 | A | 8/1997 | Shinoda et al. |
| 5,663,741 | A | 9/1997 | Kanazawa |
| 5,674,553 | A | 10/1997 | Sinoda et al. |
| 5,724,054 | A | 3/1998 | Shinoda |
| 5,786,794 | A | 7/1998 | Kishi et al. |
| 5,952,782 | A | 9/1999 | Nanto |

(Continued)

FOREIGN PATENT DOCUMENTS

EP  1093147  4/2001

(Continued)

OTHER PUBLICATIONS

Search Report from European Patent Office issued on Applicant's corresponding European Patent Application No. 06121570.3 dated on Jul. 9, 2008.

(Continued)

*Primary Examiner*—Joseph L Williams
(74) *Attorney, Agent, or Firm*—Robert E. Bushnell, Esq.

(57) ABSTRACT

A method of making a plasma display panel, whereby an address electrode is formed on a front substrate, a green sheet is formed to cover the address electrode, a dielectric layer pattern is formed by exposing, developing, and firing the green sheet, a composition for a display electrode is filled in the dielectric layer pattern and then fired to form a patterned display electrode, and a dielectric layer is formed to cover the patterned display electrode, thereby fabricating a front substrate. The green sheet includes a first green sheet that is formed using a dielectric composition, and a second green sheet that is formed on the first green sheet and using a photosensitive dielectric composition.

49 Claims, 2 Drawing Sheets

U.S. PATENT DOCUMENTS

| | | |
|---|---|---|
| 6,169,363 B1 | 1/2001 | Mori et al. |
| RE37,444 E | 11/2001 | Kanazawa |
| 6,630,916 B1 | 10/2003 | Shinoda |
| 6,707,436 B2 | 3/2004 | Setoguchi et al. |

FOREIGN PATENT DOCUMENTS

| | | |
|---|---|---|
| EP | 1187163 | 3/2002 |
| EP | 1310975 | 5/2003 |
| EP | 1381071 | 1/2004 |
| JP | 08-050811 | 2/1996 |
| JP | 08-339766 | 12/1996 |
| JP | 2845183 | 10/1998 |
| JP | 2917279 | 4/1999 |
| JP | 2000-331615 | 11/2000 |
| JP | 2001-043804 | 2/2001 |
| JP | 2001-202890 | 7/2001 |
| JP | 2001-319569 | 11/2001 |
| JP | 2001-325888 | 11/2001 |
| JP | 2005-216604 | * 8/2005 |
| JP | 2005-276762 | 10/2005 |
| WO | WO 01/91156 | 11/2001 |

OTHER PUBLICATIONS

"*Final Draft International Standard*", Project No. 47C/61988-1/Ed. 1; Plasma Display Panels—Part 1: Terminology and letter symbols, published by International Electrotechnical Commission, IEC. in 2003, and Appendix A—Description of Technology, Annex B—Relationship Between Voltage Terms And Discharge Characteristics; Annex C—Gaps and Annex D—Manufacturing.

* cited by examiner

METHOD OF MAKING A PLASMA DISPLAY PANEL AND GREEN SHEET FOR FORMING DIELECTRIC LAYERS OF THE PLASMA DISPLAY PANEL

CLAIM OF PRIORITY

This application makes reference to, incorporates the same herein, and claims all benefits accruing under 35 U.S.C. §119 from an application earlier filed in the Korean Intellectual Property Office on 7 Oct. 2005 and there duly assigned Serial No. 10-2005-0094251.

FIELD OF THE INVENTION

The present invention relates to a method of making a plasma display panel. More particularly, the present invention relates to a method of making a plasma display panel in which a dielectric layer to cover an address electrode and a dielectric layer covering display electrodes are formed in a singular process using a two-layer green sheet, and which thereby simplifies a manufacturing process and reduces manufacturing time and inferior products.

BACKGROUND OF THE INVENTION

A plasma display panel (herein referred to as a "PDP") is a display apparatus using plasma discharge. Vacuum ultraviolet (herein referred to as "VUV") rays emitted by the plasma discharge excite phosphor layers, and in turn, the phosphor layers emit visible light. The visible light is used to display images. Recently, the PDP has been implemented as a thin wide screen apparatus having a screen size of 60 inches or more and a thickness of 10 cm or less. In addition, since it is a spontaneous light emitting apparatus like a cathode ray tube (CRT), the PDP has excellent color reproducibility. Further, the PDP has no image distortion associated with its viewing angle.

Moreover, the PDP can be manufactured by a simpler method than a liquid crystal display (LCD) can, so the PDP can be produced with a low production cost and high productivity. Therefore, the PDP is expected to be the next generation of flat display apparatus for industry and home televisions.

Since the 1970s, various structures of the PDP have been developed. In recent years, a three-electrode surface-discharge type PDP has been widely used. In the three-electrode surface-discharge PDP, two electrodes including scan and sustain electrodes are disposed on one substrate, and one address electrode is disposed on the other substrate in a direction intersecting the scan and sustain electrodes. The two substrates are separated from each other so as to provide a discharge cell. The discharge cell is filled with a discharge gas. In general, in the three-electrode surface-discharge PDP, the presence of a discharge is determined by an address discharge. Specifically, the address discharge is generated as a facing discharge between the scan electrode controlled separately and the address electrode opposite to the scan electrode, and a sustain discharge related to brightness is generated as a surface discharge between the scan and sustain electrodes disposed on the same substrate.

A general AC three-electrode surface-discharge PDP includes a front substrate and a rear substrate facing each other. Address electrodes are disposed on the rear substrate along one direction, and a dielectric layer is disposed on the entire the front substrate so as to cover the address electrodes. A plurality of barrier ribs are disposed on the dielectric layer so as to define discharge cells. Red (R), green (G), and blue (B) phosphor layers are disposed in the respective discharge cells partitioned by the barrier ribs. Pairs of display electrodes are disposed on the front substrate in a direction intersecting the direction of address electrodes. Each pair of display electrodes includes a transparent electrode and a bus electrode. A dielectric layer and a protection layer made of magnesium oxide (MgO) are sequentially formed on the entire surface of the front substrate so as to cover the display electrodes. The intersections between the address electrodes of the rear substrate and the pairs of display electrodes correspond to the discharge cells.

A metal electrode in such a structure of a plasma display panel is generally formed using a pattern-printing method. The pattern-printing method is relatively simple and can make a metal electrode with narrow intervals. However, there is a limit for forming a fine width of electrodes, and the method is not suitable for large screens and the high-definition of high resolution PDPs.

SUMMARY OF THE INVENTION

An exemplary embodiment of the present invention provides a method of making a plasma display panel which simplifies a manufacturing process, and reduces manufacturing time and inferior products.

According to an embodiment of the present invention, a method of making a plasma display panel includes the following steps. An address electrode is formed on a front substrate, a green sheet is formed to cover the address electrode, a dielectric layer pattern is formed by exposing, developing, and firing the green sheet, a composition for a display electrode is filled in the dielectric layer pattern and then fired to form a patterned display electrode, and a dielectric layer is formed to cover the patterned display electrode. The green sheet includes a first green sheet that is formed using a dielectric composition (i.e., a composition for a first dielectric layer), and a second green sheet that is formed on the first green sheet and that uses a photosensitive dielectric composition (i.e., a photosensitive composition for a second dielectric layer).

The composition for a first dielectric layer may include 50 to 70 wt % of a glass powder with respect to the total weight of the composition for the first dielectric layer.

The glass powder may include at least one selected from the group consisting of $ZnO$, $B_2O_3$, $Al_2O_3$, $SiO_2$, $SnO$, $P_2O_5$, $Sb_2O_3$, and $Bi_2O_3$. The glass powder may further include at least one material selected from the group consisting of oxides of group 1 to group 5 metal elements, oxides of lanthanum-based elements, and fluorides of group 1 metal elements.

The photosensitive composition for the second dielectric layer may include a glass powder, a photosensitive binder, a cross-linking compound having at least two ethylene-based double bonds, a photopolymerization initiator, and a solvent.

According to another embodiment of the present invention, a method of making a plasma display panel includes the following steps. An address electrode is formed on a front substrate, a green sheet is formed to cover the address electrode, a dielectric layer pattern is formed by exposing, developing, and firing the green sheet, a composition for a display electrode is filled in the dielectric layer pattern and then fired to form a patterned display electrode, a dielectric layer is formed to cover the patterned display electrode, thereby fabricating a front substrate, a patterned barrier rib is formed on a rear substrate, phosphor layers are formed on the barrier rib, and the fabricated front substrate and rear substrate are assembled, evacuated, and sealed. The green sheet includes a first green sheet that is formed using a composition for a first dielectric layer, and a second green sheet that is formed on the first green sheet and that uses a photosensitive composition for a second dielectric layer.

According to yet another embodiment of the present invention, a green sheet for forming dielectric layers of a plasma display panel, including a first green sheet comprising a dielectric composition and a second green sheet formed on the first green sheet, and the second green sheet comprising a photosensitive dielectric composition.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Generally, an electrode of a plasma display panel with a predetermined height has been formed using a printing method. However, the printing method should be performed repeatedly to obtain the predetermined height or more. Therefore, more working processes are needed, and it is difficult to obtain a desirable pattern since each working process is not performed uniformly.

In the present invention, a 2-layered green sheet is used to form a dielectric layer. The green sheet includes a first green sheet that is formed using a composition for a first dielectric layer, and a second green sheet that is formed on the first green sheet and that uses a photosensitive composition for a second dielectric layer. Thereby, formation of a dielectric layer on an address electrode and another dielectric layer to cover a display electrode are performed in a single step. Display electrodes with the same height and shape can also be formed easily.

According to an embodiment of the present invention, a method of making a plasma display panel includes the following steps:

an address electrode is formed on a front substrate (S1);

a green sheet is formed to cover the address electrode (S2);

a dielectric layer pattern is formed by exposing, developing, and firing the green sheet (S3);

a composition for a display electrode is filled in the dielectric layer pattern and then fired to form a patterned display electrode (S4); and a dielectric layer is formed to cover the patterned display electrode (S5).

The green sheet includes a first green sheet that is formed using a composition for a first dielectric layer and a second green sheet that is formed on the first green sheet and that uses a photosensitive composition for a second dielectric layer.

Figure 1:
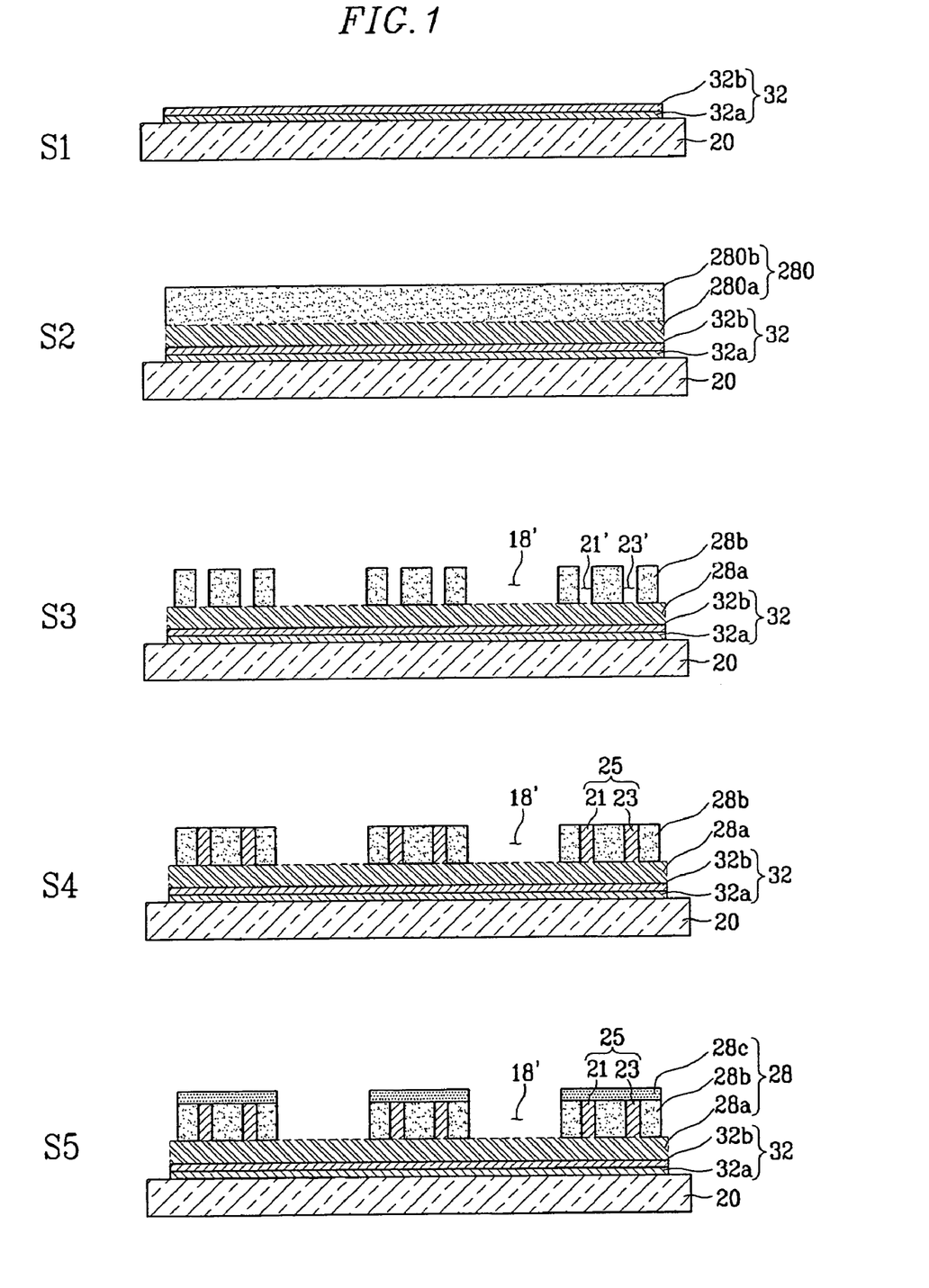
FIG. 1 is a schematic flowchart showing a method of making a plasma display panel according to one embodiment of the present invention.

FIG. 1 is a schematic flowchart showing a method of making a plasma display panel according to one embodiment of the present invention.

Referring to FIG. 1, an address electrode 32 is formed on a front substrate 20 (S1).

The substrate 20 may be a sheet-shaped insulating substrate, for example one made of glass, silicon, alumina, and so on, and is preferably a glass substrate. The insulating substrate may be subject to pretreatment such as a reagent treatment with a silane coupling agent, a plasma treatment, or thin membrane formation using an ion plating method, a sputtering method, a vapor reaction method, a vacuum deposition method, etc.

The address electrode 32 may include a protrusion electrode 32a and a bus electrode 32b. The protrusion electrode 32a may be a transparent electrode, for example an ITO (Indium Tin Oxide) electrode that is suitable for forming an opening of a panel. The bus electrode 32b may be a metal electrode such as Ag to compensate a high resistance of the transparent electrode and thereby improve conductivity thereof.

The protrusion electrode and the bus electrode may be formed in accordance with a conventional method.

For example, the protrusion electrode 32a may be formed using a photo etching method. More particularly, ITO is sputtered on a substrate, a dry film register (hereinafter referred to as "DFR") is laminated thereon, and then the DFR is patterned by exposure and development in accordance with the shape of the protrusion electrode. Subsequently, etching is performed and the DFR pattern is peeled off followed by firing to form a protrusion electrode 32a.

The bus electrode 32b may be formed using a photosensitive paste method. More particularly, a photosensitive paste for forming a bus electrode including Ag is coated, followed by leveling and drying. Subsequently, it is exposed, which can be performed by indirect exposure using a photo mask or by direct exposure. The drying and exposure are repeated three times or more, followed by development and firing to form a bus electrode 32b with a predetermined pattern.

Then a green sheet 280 is formed on the address electrode 32 to cover the address electrode (S2).

The green sheet 280 has a double-layered structure including a first green sheet 280a made of a composition for forming a first dielectric layer, and a second green sheet 280b which is formed on the first green sheet and is made of a photosensitive composition for forming a second dielectric layer.

The composition for forming a first dielectric layer may be a general composition for forming a dielectric layer and is not particularly limited. It may include lead-free glass powders which are preferably not harmful to the environment or people. Non-limiting examples of the glass powder include at least one selected from the group consisting of $ZnO$, $B_2O_3$, $Al_2O_3$, $SiO_2$, $SnO$, $P_2O_5$, $Sb_2O_3$, and $Bi_2O_3$. According to the preferred embodiment of the present invention, it may include at least one selected from the group consisting of zinc oxide-boron oxide-silicon oxide ($ZnO$—$B_2O_3$—$SiO_2$), zinc oxide-boron oxide-silicon oxide-aluminum oxide ($ZnO$—$B_2O_3$—$SiO_2$—$Al_2O_3$), bismuth oxide-boron oxide-silicon oxide ($Bi_2O_3$—$B_2O_3$—$SiO_2$), bismuth oxide-boron oxide-silicon oxide-aluminum oxide ($Bi_2O_3$—$B_2O_3$—$SiO_2$—$Al_2O_3$), bismuth oxide-zinc oxide-boron oxide-silicon oxide ($Bi_2O_3$—$ZnO$—$B_2O_3$—$SiO_2$), and bismuth oxide-zinc oxide-boron oxide-silicon oxide-aluminum oxide ($Bi_2O_3$—$ZnO$—$B_2O_3$—$SiO_2$—$Al_2O_3$).

The glass powder may include at least one selected from the group consisting of oxides of Group 1 to Group 5 metal elements, oxides of lanthanum-based elements, and fluorides of Group 1 metal elements. According to one embodiment, the glass powder may include at least one selected from the group consisting of $Na_2O$, $Li_2O$, $K_2O$, $Cs_2O$, $MgO$, $CaO$, SrO, BaO, $Sc_2O_3$, $Y_2O_3$, $TiO_2$, $ZrO_2$, $V_2O_5$, $Nb_2O_5$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, LiF, NaF, and KF. The Group 1 to Group 5 metal elements refer to the element of Group 1 to Group 5 of the periodic table according to the new IUPAC agreement, for example, including Li (Group 1), Be (Group 2), Sc (Group 3), Ti (Group 4), and V (Group 5).

The glass powder is prepared by mixing all the components, and fusing, dry cooling, dry pulverizing, and crushing them. The glass powder prepared according to the method has good fineness and color.

The glass powder is not limited to any shape thereto, but a spherical shape is preferable. It has an average particle diameter ranging from 0.1 to 5 μm, and is preferably 0.5 to 2 μm. When the average particle diameter of the glass powder is out of the above range, the surface of the dielectric layer pattern formed after firing is non-uniform and the linearity of the pattern may be reduced.

The composition for forming a first dielectric layer may include 50 to 70 wt %, and preferably 55 to 65 wt %, of the glass powder based on the total weight of the composition for forming the first dielectric layer. When the amount of the glass powder is less than 50 wt %, greater amounts of a binder and a plasticizer are needed and thus sintering characteristics of the composition may be deteriorated. When it is more than 70 wt %, relative amounts of a binder and a plasticizer are reduced and thus it is hard to handle and work with.

The composition for forming a first dielectric layer may include a balance amount of a solvent, a binder, or a plasticizer, which are generally used in forming a dielectric layer.

The photosensitive composition for forming a second dielectric layer includes i) a glass powder, ii) a photosensitive binder, iii) a cross-linking compound having at least two ethylene-based double bonds, iv) a photopolymerization initiator, and v) a solvent.

The glass powder is the same as one used in the composition for forming a first dielectric layer.

The photosensitive composition for forming a second dielectric layer may include 50 to 65 wt %, and preferably 55 to 60 wt %, of a glass powder based on a total weight of the photosensitive composition for forming the second dielectric layer. When the amount of the glass powder is less than 50 wt %, sintering characteristics of the composition may be deteriorated. When it more than 65 wt %, it is hard to handle and work with.

The photosensitive binder may be a polymer which can be cross-linked by a photo-initiator and can be easily removed by development during formation of a pattern of a dielectric layer.

Such a photosensitive binder may be an acryl-based resin, a styrene resin, a novolac resin, or a polyester resin which is generally used in a photoresist composition. According to one embodiment, the photosensitive binder may be a polymer which is obtained by polymerizing at least monomer selected from the group consisting of a) a monomer having a carboxyl group, b) a monomer having a OH group, and c) another monomer that can be copolymerized.

a) A Monomer Having a Carboxyl Group

The monomer having a carboxyl group may include acrylic acid, methacrylic acid, maleic acid, fumaric acid, crotonic acid, itaconic acid, citraconic acid, mesaconic acid, cinamic acid, mono (2-(meth)acryloyloxyethyl)succinate, or ω-carboxyl-polycaprolactone mono(meth)acrylate.

b) A Monomer Having a OH Group

The monomer having an OH group may include 2-hydroxyethyl(meth)acrylate, 2-hydroxypropyl(meth)acrylate, 3-hydroxypropyl(meth)acrylate, a phenolic monomer having a OH group such as o-hydroxystyrene, m-hydroxystyrene, p-hydroxystyrene, and so on.

c) Another Monomer that can be Copolymerized

Another monomer that can be copolymerized may include a (meth)acrylic acid ester such as methyl(meth)acrylate, ethyl (meth)acrylate, n-butyl(meth)acrylate, n-lauryl(meth)acrylate, benzyl(meth)acrylate, glycidyl(meth)acrylate, dicyclopentanyl(meth)acrylate, phosphate acrylate; an aromatic vinyl-based monomer such as styrene, α-methylstyrene, and so on; a conjugated diene such as butadiene, isoprene, and so on; a macromonomer (polymer) having a polymerizable unsaturated group such as a (meth)acryloyl group at one end of a polymer chain, such as polystyrene, poly(methyl(meth)acrylate), poly(ethyl(meth)acrylate), poly(benzyl(meth)acrylate), and so on.

The photosensitive binder has a number average molecular weight (Mn) ranging from 5,000 to 50,000, so that it may have a suitable viscosity for coating the photosensitive composition for forming a second dielectric layer on a substrate and may be decomposed during a development process. When the molecular weight of the photosensitive binder is less than 5,000, the photosensitive dielectric layer cannot be closely attached during the development process. When it is more than 50,000, it induces development failure. The photosensitive binder has an acid value ranging from 20 to 100 mg KOH/g. When the acid value is less than 20 mg KOH/g, it is hard to dissolve in an alkali aqueous solution which causes a failure of development. When it is more than 100 mg KOH/g, the photosensitive dielectric layer cannot be closely attached during the development process, or exposed portions may dissolve.

The photosensitive binder may be used in an amount of 5 to 10 wt %, and preferably at 5 to 7 wt % based on the total weight of the photosensitive composition for forming a second dielectric layer. When the amount of the photosensitive binder is less than 5 wt %, printing properties are poor, whereas when it is more than 10 wt %, development failure may be caused or residue may remain around a dielectric layer after firing.

The cross-linking compound having at least two ethylene-based double bonds is any compound to which a radical polymerization reaction can be performed by a photoinitiator, and it is not particularly limited. For example, it may include an acrylate, a methacrylate, or a mono-, di-, tri- or more ester which is obtained by a reaction of a polybasic acid and hydroxy alkyl(meth)acrylate. The polybasic acid may include phthalic acid, adipic acid, maleic acid, itaconic acid, trimellitic acid, terephthalic acid, and so on. The listed monomer may be used singularly, in combination, or in a copolymer. According to one embodiment, the cross-linking compound may be at least one selected from the group consisting of 1,4-butanedioldiacrylate, 1,3-butylene glycol diacrylate, ethylene glycol diacrylate, pentaerythrytol tetraacrylate, triethylene glycol diacrylate, dipentaerythrytol diacrylate, sorbitol triacrylate, a bisphenol A diacrylate derivative, trimethylol propane triacrylate, trimethylol propane triacrylate modified with ethylene oxide, dipentaerythrytol polyacrylate, 1,4-butanediol dimethacrylate, 1,3-butylene glycol dimethacrylate, ethylene glycol dimethacrylate, pentaerythrytol tetramethacrylate, triethylene glycol dimethacrylate, dipentaerythrytol dimethacrylate, sorbitol trimethacrylate, bisphenol A dimethacrylate derivative, trimethylol propane trimethacrylate, trimethylol propane trimethacrylate modified with ethylene oxide, dipentaerythrytol polymethacrylate, a copolymer thereof and so on.

The cross-linking compound is added in a predetermined ratio based on the amount of the photosensitive binder. It may be added in an amount of 20 to 150 parts by weight based on 100 parts by weight of the photosensitive binder. When the amount of the cross-linking compound is calculated based on the photosensitive composition for forming a second dielectric layer, the amount corresponds to 1 to 15 wt %, and preferably 3 to 10 wt % based on the total weight of the photosensitive composition for forming a second dielectric layer. When the amount of the cross-linking compound is less than 1 wt %, exposure sensitivity may be reduced during exposure for forming a dielectric layer, and a defect in a dielectric layer pattern may be formed during development. When it is more than 15 wt %, excessive cross-linking may occur and thereby a rough pattern may be formed after development, and pattern linearity may be reduced.

The photopolymerization initiator may include any compound that generates radicals during an exposure process, and that initiates a cross-linking reaction of the cross-linking compound, and it is not particularly limited. Typical examples of the photopolymerization initiator include benzoin, benzoin alkyl ethers such as benzoin methylether, benzoin ethylether, or benzoin isopropylethyl; acetophenone-based compounds such as acetophenone, 2,2-dimethoxy-2-phenylacetophenone, 2,2-diethoxy-2-phenylacetophenone, 1,1-dichloroacetophenone; aminoacetophenones such as α-amino acetophenone, 2-methyl-1-[4-(methylthio)phenyl]-2-morpholinopropanone-1,2-benzyl-2-dimethylamino-1-(4-morpholinophenyl)-butanone-1; anthraquinones such as 2-methylanthraquinone, 2-ethylanthraquinone, 2-t-butylanthraquinone; thioxanthone such as 2,4-dimethylthioxanthone; ketals such as acetophenonedimethylketal, benzyldimethylketal, and so on; benzophenone; xanthone; triazine; imidazole; phosphineoxide such as (2,6-dimethoxybenzoyl)-2,4,4-trimethylpentylphosphineoxide, bis(2,4,6-trimethylbenzoyl)-phenylphosphineoxide, 2,4,6-trimethylbenzoyldiphenylphosphineoxide, ethyl-2,4,6-trimethylbenzoylphenylphosphinate, and so on; and various peroxides. Preferably, α-amino acetophenone (Irgacure907® Ciba Specialty Chemicals Ltd.) may be used.

The photopolymerization initiator is added in a predetermined ratio based on the amount of the cross-linking compound. It may be added in an amount of 10 to 50 parts by weight based on 100 parts by weight of the cross-linking compound. When the amount of the photopolymerization initiator is calculated based on the photosensitive composition for forming a second dielectric layer, the amount corresponds to 0.1 to 8 wt %, and preferably 0.3 to 5 wt %, based on the total weight of the photosensitive composition for forming a second dielectric layer. When the amount of the photopolymerization initiator is less than 0.1 wt %, exposure sensitivity may be reduced and it is difficult to obtain a good pattern, and linearity of a pattern may be reduced. When it is more than 8 wt %, storage stability may be reduced and excessive cross-linking may occur and thereby a rough pattern may be formed after development.

The photosensitive composition for forming a second dielectric layer includes a solvent to improve coating of the composition.

Suitable solvents may be selected depended on dissolution and coating properties of the components of the photosensitive composition for forming the second dielectric layer. Typical examples include ketones such as diethylketone, methylbutylketone, dipropylketone, cyclohexanone, and so on; alcohols such as n-pentenol, 4-methyl-2-pentenol, cyclohexanol, diacetonealcohol, and so on; ether-based alcohols such as ethylene glycol monomethylether, ethylene glycol monoethylether, ethylene glycol monobutylether, propylene glycol monomethylether, propylene glycol monoethylether, and so on; saturated aliphatic monocarboxylic acid alkyl esters such as n-butyl acetate and amyl acetate; lactic acid esters such as ethyl lactate, n-butyl lactate, and so on; and ether-based esters such as methylcellosolve acetate, ethylcellosolve acetate, propylene glycol monomethylether acetate, ethyl-3-ethoxypropanoate, 2,2,4-trimethyl-1,3-pentanediol mono(2-methylpropanoate), and so on. The solvent may be used singularly or in a mixture.

The solvent may be used in a balance amount of the photosensitive composition for forming a second dielectric layer. It may be used in an amount of 4 to 30 wt %, and preferably 10 to 25 wt % based on the total weight of the photosensitive composition for forming a second dielectric layer to obtain a composition having a suitable viscosity.

The photosensitive composition for forming a second dielectric layer may include an additive depending on properties of the composition to be obtained.

The additive may include a sensitizer for improving sensitivity; a polymerization inhibitor for improving storage stability of a coating composition, such as phosphoric acid, phosphoric acid ester, or a carboxylic acid-containing compound; an oxidation inhibitor; an ultraviolet ray absorber for improving resolution; an antifoaming agent for reducing pores in a coating composition such as a silicon-based or acryl-based compound; a dispersing agent for improving dispersion properties; a leveling agent for improving flatness of a printed layer, such as polyester modified dimethylpolysiloxane, polyhydroxycarboxylic acid amide, a silicon-based polyacrylate copolymer, or a fluoro-based paraffin compound; or a plasticizer for endowing thixotropy characteristics. The additive may be added as needed in a suitable amount.

The photosensitive composition for forming a second dielectric layer is prepared by dispersing glass powders, a photosensitive binder, a cross-linking compound having at least two ethylene-based double bonds, and a photopolymerization initiator in a solvent. The photosensitive binder and the photopolymerization initiator are mixed first, and then the glass powder, cross-linking compound, and solvent are added to disperse the mixture.

The compositions for forming a first dielectric layer and the photosensitive composition for forming a second dielectric layer may be coated on a supporter such as polyethyleneterephthalate film using a general coating method such as knife coating or die coating, and then dried to remove a solvent. Thereby, a film-shaped first green sheet 280a and the second green sheet 280b are formed. The first green sheet 280a and the second green sheet 280b are stacked to each other to make a green sheet 280.

The first green sheet 280a may be thicker than the second green sheet 280b. According to one embodiment, the first green sheet 280a and the second green sheet 280b may be formed in a thickness ratio ranging 3:1 to 4:1. When the second green sheet 280b is thicker than the first green sheet 280a, cost may increase and a high-definition pattern may be difficult to obtain.

The second green sheet 280b has a thickness ranging from 5 to 30 μm, preferably 8 to 25 μm, and more preferably 10 to 20 μm when considering a thickness of a display electrode of a plasma display panel.

The green sheet 280 is laminated on a substrate 20 on which an address electrode 32 is formed, then the green sheet 280 is subject to exposure and development, and is fired to form a pattern of a dielectric layer 28 (S3).

The exposure may be performed with respect to the photosensitive second green sheet 280b. The exposure may be performed by optionally radiating UV rays to the second green sheet 280b through a patterned photomask. Alternatively, it can be performed in a direct imaging (DI) manner.

For an exposure light source, halogen lamps, high pressure mercury lamps, laser lights, metal halogen lamps, black lamps, electrodeless lamps, and so on may be used. The exposing amount ranges from 50 to 1,000 $mJ/cm^2$.

After exposure, a development process is performed by spraying a development solution or by dipping in the development solution. The development solution may be a base aqueous solution. The base may be selected from the group consisting of an inorganic alkali compound such as lithium hydroxide, sodium hydroxide, potassium hydroxide, sodium hydrogen phosphate, diammonium hydrogen phosphate, dipotassium hydrogen phosphate, disodium hydrogen phosphate, ammonium dihydrogen phosphate, potassium dihydrogen phosphate, sodium dihydrogen phosphate, lithium silicate, sodium silicate, potassium silicate, lithium carbonate, sodium carbonate, potassium carbonate, lithium borate, sodium borate, potassium borate, ammonia, and so on; and an organic alkali compound such as tetramethyl ammonium hydroxide, trimethyl hydroxyl ethyl ammonium hydroxide, monomethylamine, dimethylamine, trimethylamine, monoethylamine, diethylamine, triethylamine, monoisopropylamine, diisopropylamine, ethanolamine, and so on.

The development solution has a concentration ranging 0.1 to 1%, and is preferably 0.2 to 0.6%. When the concentration is less than 0.2%, the time for forming a pattern is lengthened, whereas when it is more than 1%, pattern uniformity is reduced.

The development solution has a temperature ranging from 25° C. to 55° C., and is preferably 30° C. to 45° C. When the temperature is less than 25° C., development time increases, whereas when it is more than 40° C., a process margin for forming a pattern decreases.

Through the exposure, the photopolymerization initiator is exposed to ultraviolet rays and decomposed to generate free radicals. The active radicals attack a double bond of the cross-linking compound to induce a polymerization reaction. The cross-linking compound has at least two double bonds in one molecule and thereby forms a polymer having a three dimensional network structure through a polymerization reaction. The polymer is not removed by the development solution.

When the photosensitive binder of the non-exposed portions is dissolved out by an alkali aqueous solution during development, the glass powder and unreacted cross-linking compound are removed together. Thereby, the non-exposed portions have a different shape to that of the exposed portions to form a patterned second dielectric layer 28b.

After the development process, any unnecessary development solution may be removed by rinsing or performing neutralization with acid.

Subsequently, the patterned second dielectric layer 28b is fired. In according to the above process, spaces 21' and 23' for forming display electrodes and a discharge cell 18' are formed in the second dielectric layer 28b simultaneously.

The firing process may be performed at a temperature ranging from 480° C. to 620° C., and preferably at 500° C. to 580° C. It is performed for 3 to 6 hours, and preferably 4 to 5 hours. When the firing temperature and time are out of the range, moisture is not completely removed, and binder is also not removed completely.

Then, a composition for forming a display electrode is filled in the pattern of the dielectric layer followed by firing to form a patterned display electrode (S4).

More specifically, a composition for forming a display electrode is filled in spaces for forming display electrodes 21' and 23' between the patterns of the second dielectric layer 28b and fired to form a display electrode 25 including a sustain electrode 21 and a scan electrode 23.

The composition for forming a display electrode may be a composition which is generally used for making a display electrode, without limitation. The composition may include at least one metal selected from the group consisting of silver (Ag), gold (Au), aluminum (Al), copper (Cu), nickel (Ni), chromium (Cr), and a silver-palladium alloy (Ag—Pd).

The firing process during forming a patterned display electrode may be performed at a temperature of 500° C. to 600° C., and preferably at 550° C. to 580° C. The firing time may range from 3 to 6 hours, and is preferably 4 to 5 hours. When the firing temperature and time are out of the range, pores may be formed.

After the patterned display electrode is formed, a third dielectric layer 28c is formed to cover the display electrode 25 (S5).

More specifically, a composition for forming a third dielectric layer is coated to cover the display electrode 25 followed by firing to form the third dielectric layer 28c. The third dielectric layer 28c may be extended to cover the second dielectric layer 28b as well as the display electrode 25.

The third dielectric layer may be formed using a general coating composition for forming a first dielectric layer and a coating method. More preferably, the third dielectric layer may be formed using the same composition as the composition for forming the first dielectric layer.

After forming the patterned display electrode, a protection layer may additionally be formed to cover the dielectric layer formed on the display electrode.

The protection layer may include at least one layer selected from the group consisting of a fluoride layer and an oxide layer. More specifically, the protection layer may include a fluoride compound such as $MgF_2$, $CaF_2$, or LiF; and an oxide compound such as MgO, $Al_2O_3$, ZnO, CaO, SrO, $SiO_2$, or $La_2O_3$.

The protection layer may be formed with any a thick-layer printing method using a paste or a deposition method using a plasma, but the method is not limited to thereto. The protection layer formed by the deposition method has relatively good resistance to ion impacts, and can release secondary electrons to thereby reduce a discharge maintenance voltage and discharge initiation voltage.

The plasma deposition method may include a magnetron sputtering method, electron beam deposition, IBAD (ion beam assisted deposition), CVD (chemical vapor deposition), an ion plating method, and so on.

On the rear substrate, a predetermined shape of barrier ribs and phosphor layers may be formed successively in accordance with a conventional process.

The fabricated rear substrate and the front substrate are assembled with each other, followed by evacuating and sealing them to make a plasma display panel.

As described above, a dielectric layer to cover an address electrode and a dielectric layer covering display electrodes are formed in a singular process using two-layer green sheet, which thereby simplifies a manufacturing process and reduces manufacturing time and inferior products.

The present invention also provides a method of making a plasma display panel.

Figure 2:
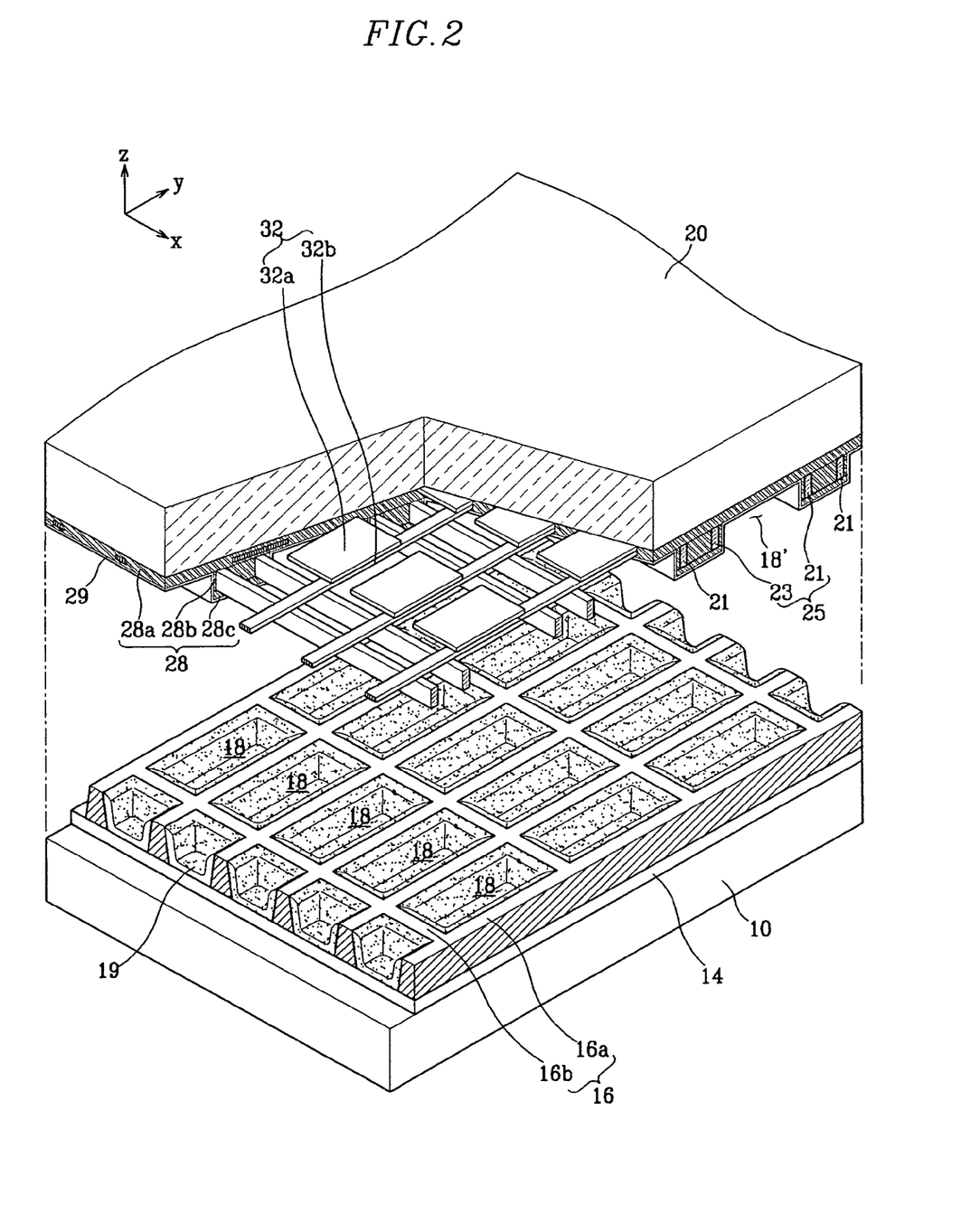
FIG. 2 is a schematic exploded perspective view showing a plasma display panel according to one embodiment of the present invention.

FIG. 2 is a schematic exploded perspective view showing a plasma display panel in accordance with one embodiment of the present invention. The plasma display panel includes a rear substrate 10 and a front substrate 20 which are disposed to be opposed to each other with a predetermined interval therebetween, and a plurality of discharge cells 18 and 18' separated by the barrier ribs 16 between the two substrates 10 and 20. Phosphor layers 19 to absorb ultraviolet rays and release visible rays are formed on the sidewalls of the barrier ribs 16 and the bottom surfaces of discharge cells 18 and 18' in which discharge gases, for example a mixed gas of xenon (Xe), neon (Ne), etc. are filled, to cause a plasma discharge.

Address electrodes 32 are disposed on the front substrate 20 along one direction (y-axis direction of the drawing). A dielectric layer 28 is disposed on the entire interior surface of the front substrate 20 so as to cover the address electrodes 32. The neighboring address electrodes 32 are arranged with a predetermined interval therebetween.

Each of the address electrodes 32 includes a protrusion electrode 32a and a bus electrode 32b. The bus electrode 32b extends along one edge of the discharge cells 18 and 18'. The protrusion electrode 32a protrudes from the bus electrode 32b toward the opposite edge of the discharge cells 18 and 18'. As described above in the method of making a plasma display panel, the protrusion electrode 32a is a transparent electrode made of, for example, indium tin oxide (ITO) in order to increase the aperture ratio of the panel. The bus electrode 32b is preferably a metallic electrode to increase the conductivity of the bus electrode 32b by compensating for a high resistance of the protrusion electrode 32a. The protrusion electrode 32a may have preferably a rectangular shape.

Display electrodes 25 are disposed in proximity to the address electrodes 32. The display electrodes 25 are electrically isolated and separated from the address electrodes 32 by a front dielectric layer 28.

Each of the display electrodes 25 in a respective discharge cell includes a sustain electrode 21 and a scan electrode 23. The sustain electrode 21 and scan electrode-23 extend in a direction (the x direction in the drawing) intersecting the address electrode 32. The sustain electrodes 21 are used to apply a discharge voltage during a sustain period. The scan electrodes 23 are used to apply discharge voltages in reset, address, and sustain periods. The scan electrodes 23 are involved in all of the discharges of the reset, address, and sustain periods. The sustain electrodes 21 are mainly involved in discharge during the sustain period. The functions of the electrodes vary according to the discharge voltages applied to the electrodes. Therefore, the electrodes are not limited to the aforementioned functions.

The respective pair of sustain and scan electrodes are disposed in one discharge cell in FIG. 2. Alternatively, the sustain or scan electrodes may be disposed in the boundary of neighboring discharge cells, the sustain or scan electrode thereby being used for both neighboring discharge cells.

In this embodiment, the sustain electrode 21 and the scan electrode 23 protrude in a direction (the opposite direction of z direction in the drawing) from the front substrate 20 to the rear substrate 10. In addition, the sustain electrode 21 and the scan electrode 23 face each other so as to define a space therebetween. A facing discharge is generated in the space between the sustain electrode 21 and the scan electrode 23.

In the embodiment, the sustain electrodes 21, the scan electrodes 23, and the address electrodes 32 are formed in different layers and are electrically isolated by a dielectric layer 28. The dielectric layer 28 includes a first dielectric layer 28a, a second dielectric layer 28b, and a third dielectric layer 28c. The first dielectric layer 28a is formed so as to cover the address electrodes 32 in the front substrate 20. The second dielectric layer 28b is formed so as to surround the sustain electrodes 21 and scan electrodes 23, which are the display electrodes 25 disposed on the first dielectric layer 28a. The third dielectric layer 28c is formed so as to cover a display electrode 25 exposed to the discharge cell.

The first dielectric layer 28a is formed using the first green sheet prepared from a composition for forming a first dielectric layer. The second dielectric layer 28b is formed using the second green sheet prepared from a photosensitive composition for forming a second dielectric layer. The second green sheet is formed on the first green sheet and then exposure, development, and firing are performed. During the above process, the photosensitive components are reacted in the second green sheet to form a dielectric layer pattern. Subsequently a composition for a display electrode is filled in the dielectric layer pattern to form a patterned display electrode.

The third dielectric layer 28c may be formed so as to cover the display electrode 25 disposed toward to a discharge cell. The third dielectric layer 28c may be formed using the same composition as the composition for the first dielectric layer 28a in accordance with a conventional method.

A MgO protection layer 29 may be formed on the first dielectric layer 28a, the second dielectric layer 28b, and the third dielectric layer 28c in order to protect them from the impact of ions during the plasma discharge. In addition, since it has a high secondary electron emission coefficient with respect to the impacting ions, the protective layer 29 can improve discharge efficiency.

On the rear substrate 10, patterned barrier ribs 16 are disposed. In this embodiment, the barrier ribs 16 include first barrier rib members 16a and second barrier rib members 16b. The first barrier rib members 16a extend in a direction parallel to the address electrode 32, and the second barrier rib members 16b intersect the first barrier rib member 16a and compartmentalize each discharge cell 18 and 18' to be an independent space. The barrier ribs may be disposed in various structures, such as stripe and matrix structures. In the stripe structure, longitudinal barrier ribs are disposed parallel to each other and to address electrodes. In the matrix structure, each discharge cell is partitioned to be an independent cell.

As shown in FIG. 2, a dielectric layer 14 may be formed on the rear substrate 10.

In the PDP according to this embodiment of the present invention, all of the electrodes associated with discharge in the discharge cells 18 are disposed on the front substrate 20. Namely, the address electrodes 32 and the display electrodes 25 (sustain electrodes 21 and scan electrodes 23) are disposed on the front substrate 20. As a result, the discharge space partitioned by the barrier ribs 16 can increase. In turn, the area of the coated phosphor layers can increase so that discharge efficiency can be improved. In addition, the associated accumulation of charge on the phosphor layers can prevent shortening of the life-span of the phosphor layers due to ion sputtering.

The following examples illustrate the present invention in more detail. However, it is understood that the present invention is not limited by these examples.

EXAMPLES

Preparation Example 1

Preparation of a Green Sheet

A first green sheet was prepared by coating a polyethyleneterephthalate supporter with a composition for forming a first dielectric layer, which included a glass powder of $SiO_2$—$ZnO$—$B_2O_3$ with an average particle diameter of 1 μm (69.8 wt % of $SiO_2$, 28.4 wt % of ZnO, and 1.8 wt % of $B_2O_3$), and then drying it to be 45 μm thick.

A second green sheet was prepared by coating a polyethyleneterephthalate supporter with a composition for forming a second dielectric layer, which was prepared by dissolving 8 wt % of an acrylate copolymer resin (22 wt % of benzylmethacrylate, 25 wt % of methacrylic acid, 7 wt % of phosphateacrylate, 20 wt % of 2-hydroxyethylmethacrylate, and 26 wt % of methylmethacrylate based on the total weight of monomers), 10 wt % of TMP(EO)$_3$TA, and 2 wt % of Irgacure 907 into 20 wt % of PGMEA, and thereafter dispersing 60 wt % of a glass powder of $SiO_2$—$ZnO$—$B_2O_3$, and then drying it to be 15 μm thick.

A green sheet was prepared by assembling the first green sheet with the second green sheet.

TMP(EO)$_3$TA: trimethylolpropane triacrylate modified with ethylene oxide (manufactured by a Japanese chemical company)

Irgacure907: manufactured by Ciba Specialty Chemicals Ltd.

PGMEA: propylene glycol monomethylether acetate

Preparation Example 2

Preparation of a Green Sheet

Another green sheet was prepared according to the same method as in Preparation Example 1, except for using a glass powder of $B_2O_3$—BaO—ZnO with an average particle diameter of 0.1 μm (comprising 70 wt % of $B_2O_3$, 15 wt % of BaO, and 10 wt % of ZnO) instead of the $SiO_2$—$ZnO$—$B_2O_3$ glass powder.

Preparation Example 3

Preparation of a Green Sheet

A green sheet was prepared according to the same method as in Preparation Example 1, except for using a glass powder of $Bi_2O_3$—$B_2O_3$—$SiO_2$—$Al_2O_3$—$Na_2O$—MgO with an average particle diameter of 5 μm (25 wt % of $Bi_2O_3$, 25 wt % of $B_2O_3$ 30 wt % of $SiO_2$, 15 wt % of $Al_2O_3$, 2 wt % of $Na_2O$, and 3 wt % of MgO) instead of the $SiO_2$—$ZnO$—$B_2O_3$ glass powder.

Example 1

Manufacture of a Plasma Display Panel

A front substrate made of soda lime glass was sputtered with indium tin oxide and a dry film register (DFR) was laminated thereon. A patterned photo mask was additionally laminated on the DFR, and thereafter it was exposed by using high pressure mercury lamp, developed by using a 0.4% $Na_2CO_3$ alkali aqueous solution, and dried to pattern the DFR to have a shape corresponding to a protrusion electrode. Then, protrusion electrodes were formed by etching the patterned substrate with hydrochloric acid and nitric acid, peeling the DFR patterned part with an aqueous solution containing 5.0% of NaOH, and then firing it. A photosensitive paste for forming a bus electrode including Ag was applied on the protrusion electrodes. The coated photosensitive paste including Ag was leveled, dried, and thereafter exposed by using a DI (direct imaging) exposer. Next, bus electrodes having a stripe pattern were formed by repeating drying and exposing five times on the resultant substrate, developing it with a 0.4% $Na_2CO_3$ aqueous solution, and firing it. Then, address electrodes including the protrusion electrodes and the bus electrodes were fabricated.

Then, the green sheet prepared in Preparation Example 1 was laminated on the substrate including the address electrode formed thereon. Thereafter, it was exposed 100 mJ/cm$^2$ by using a DI (direct imaging) exposer, developed by spraying a 0.4% $Na_2CO_3$ alkali aqueous solution thereon, and fired at 500° C. for 4 hours to form a dielectric layer pattern.

The dielectric layer pattern was filled with a composition for forming a display electrode including Cr—Cu—Cr and fired at 500° C. for 4 hours to form a patterned display electrode.

A composition for forming a first dielectric layer, which includes a glass powder of $SiO_2$—$ZnO$—$B_2O_3$ (69.8 wt % of $SiO_2$, 28.4 wt % of ZnO, and 1.8 wt % of $B_2O_3$), was additionally coated on the patterned display electrode, and was dried and fired to form a dielectric layer.

Separately, a rear substrate was formed with a patterned barrier rib and a phosphor layer. Then, it was assembled with the above fabricated front substrate formed with the address electrode, the display electrode, and the dielectric layer. Thereafter, the air in a discharge cell was evacuated, and discharge gases were injected under a condition of 400 Torr to manufacture a resultant plasma display panel.

Example 2

Manufacture of a Plasma Display Panel

A plasma display panel was manufactured according to the same method as in Example 1, with the exception of using the green sheet prepared in Preparation Example 2.

Example 3

Manufacture of a Plasma Display Panel

A front substrate made of soda lime glass was sputtered with indium tin oxide, and a dry film register (DFR) was laminated thereon. A patterned photo mask was additionally laminated on the DFR, and thereafter the laminated substrate was exposed by using a high pressure mercury lamp, developed by using a 0.4% $Na_2CO_3$ alkali aqueous solution, and dried to pattern the DFR to have a shape corresponding to a protrusion electrode. Then, protrusion electrodes were formed by etching the patterned substrate with hydrochloric acid and nitric acid, peeling the DFR patterned part with an aqueous solution containing 5.0% of NaOH, and then firing it. A photosensitive paste for forming a bus electrode including Ag was applied on the protrusion electrodes of the front substrate. The coated photosensitive paste including Ag was leveled, dried, and thereafter exposed by using a DI (direct imaging) exposer. Bus electrodes with a stripe pattern were formed by repeating the drying and exposing five times on the resulting substrate, developing it by using a 0.4% $Na_2CO_3$ alkali aqueous solution, and firing it. Then, address electrodes including the protrusion electrodes and the bus electrodes were fabricated.

Next, a green sheet prepared according to Preparation Example 3 was laminated on the substrate including the address electrode formed thereon, exposed 100 mJ/cm$^2$ by using a DI (direct imaging) exposer, developed by using a 0.4% $Na_2CO_3$ alkali aqueous solution, and fired at 500° C. for 4 hours to form a dielectric layer pattern.

Then, the dielectric layer pattern was filled with a composition for forming a display electrode including Cr—Cu—Cr and fired at 550° C. for 4 hours to form a patterned display electrode.

The patterned display electrode was additionally coated with a composition for forming a third dielectric layer including a glass powder of $Bi_2O_3B_2O_3$—$SiO_2$—$Al_2O_3$—$Na_2O$—MgO, dried, and fired to form a third dielectric layer.

Then, a front substrate was fabricated by putting the substrate with the dielectric layer in a protection layer deposition room and depositing a protection layer including MgO with an ion plating method. The deposition room was internally maintained to have a basic pressure of $1 \times 10^{-4}$ Pa and a pressure of $5.3 \times 10^{-2}$ Pa during the deposition, and was supplied with oxygen at 100 sccm (a flux volume unit) to keep the substrate at 200±5° C.

Separately, a plasma display panel was made by forming a barrier rib and a phosphor layer on a rear substrate, and assembling it with the above fabricated front substrate having an address electrode, a display electrode, and a dielectric layer. Thereafter, the air in a discharge cell was evacuated and discharge gases were injected into the discharge cell under a condition of 400 Torr to manufacture a resultant plasma display panel.

Comparative Example 1

Manufacture of a Plasma Display Panel

A front substrate made of soda lime glass was sputtered with indium tin oxide and a dry film register (DFR) was laminated thereon. A patterned photo mask was additionally laminated on the DFR, and thereafter it was exposed by using high pressure mercury lamp, developed by using a 0.4% $Na_2CO_3$ alkali aqueous solution, and dried to pattern the DFR to have a shape corresponding to a protrusion electrode. Then, protrusion electrodes were formed by etching the patterned substrate with hydrochloric acid and nitric acid, peeling the DFR patterned part with an aqueous solution containing 5.0% of NaOH, and then firing it. A photosensitive paste for forming a bus electrode including Ag was applied on the protrusion electrodes. The coated photosensitive paste including Ag was leveled, dried, and thereafter was exposed by using a DI (direct imaging) exposer. Next, bus electrodes having a stripe pattern were formed by repeating drying and exposing five times on the resultant substrate, developing it with a 0.4% $Na_2CO_3$ aqueous solution, and firing it. Then, address electrodes including the protrusion electrodes and the bus electrodes were fabricated.

Next, a first dielectric layer was formed by coating a composition for forming a first dielectric layer, which includes a glass powder of PbO—$B_2O_3$—$SiO_2$, and drying and then firing it.

The dielectric layer was coated with a composition for forming a display electrode including Cr—Cu—Cr in a screen-coating method. Then, a display electrode was formed by repeating the coating and drying process ten times.

A dielectric layer pattern was formed by coating a photosensitive composition for forming a second dielectric layer, which was prepared by dissolving 8 wt % of an acrylate copolymer resin (22 wt % of benzylmethacrylate, 25 wt % of methacrylic acid, 7 wt % of phosphateacrylate, 20 wt % of 2-hydroxyethylmethacrylate, and 26 wt % of methylmethacrylate based on the entire monomer), 10 wt % of $TMP(EO)_3TA$, and 2 wt % of Irgacure907 into 20 wt % of PGMEA, and thereafter dispersing 60 wt % of a glass powder of PbO—$B_2O_3$—$SiO_2$, and then drying, exposing, developing, and firing it.

Separately, a rear substrate was formed with a rear dielectric layer, a barrier rib, and a phosphor layer. The rear substrate was assembled with the front substrate with the address electrode, the display electrode, and the dielectric layer. Thereafter, a plasma display panel was fabricated by evacuating the air in a discharge cell and injecting a discharge gas thereinto under a condition of 400 Torr.

Compared with Comparative Example 1, manufacturing processes of Examples 1 to 3 turned out to sharply reduce the time taken for manufacturing a plasma display.

In accordance with a method of making a plasma display panel of the present invention, a dielectric layer to cover an address electrode and a dielectric layer covering display electrodes can be formed in a singular process using a two-layer green sheet, and it thereby simplifies a manufacturing process and reduces manufacturing time and inferior products.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of making a plasma display panel, comprising:
forming an address electrode on a front substrate;
forming a green sheet to cover the address electrode, the green sheet comprising a first green sheet and a second green sheet formed on the first green sheet, the first green sheet formed using a composition for a first dielectric layer, the second green sheet formed using a photosensitive composition for a second dielectric layer;
forming a dielectric layer pattern by exposing, developing, and firing the second green sheet;
filling a composition for a display electrode in the dielectric layer pattern and then firing the filled composition to form a patterned display electrode; and
forming a third dielectric layer on the patterned display electrode.

2. The method of claim 1, wherein the composition for the first dielectric layer comprises at least one glass powder selected from the group consisting of ZnO, $B_2O_3$, $Al_2O_3$, $SiO_2$, SnO, $P_2O_5$, $Sb_2O_3$, and $Bi_2O_3$.

3. The method of claim 2, wherein the glass powder is at least one selected from the group consisting of zinc oxide-boron oxide-silicon oxide (ZnO—$B_2O_3$—$SiO_2$), zinc oxide-boron oxide-silicon oxide-aluminum oxide (ZnO—$B_2O_3$—$SiO_2$—$Al_2O_3$), bismuth oxide-boron oxide-silicon oxide ($Bi_2O_3$—$B_2O_3$—$SiO_2$), bismuth oxide-boron oxide-silicon oxide-aluminum oxide ($Bi_2O_3$—$B_2O_3$—$SiO_2$—$Al_2O_3$), bismuth oxide-zinc oxide-boron oxide-silicon oxide ($Bi_2O_3$—ZnO—$B_2O_3$—$SiO_2$), bismuth oxide-zinc oxide-boron oxide-silicon oxide-aluminum oxide ($Bi_2O_3$—ZnO—$B_2O_3$—$SiO_2$—$_2O_3$), and a combination thereof.

4. The method of claim 2, wherein the glass powder further comprises at least one material selected from the group consisting of an oxide of a group 1 to group 5 metal element, an oxide of a lanthanum-based element, and a fluoride of a group 1 metal element.

5. The method of claim 2, wherein the glass powder further comprises at least one selected from the group consisting of $Na_2O$, $Li_2O$, $K_2O$, $Cs_2O$, MgO, CaO, SrO, BaO, $Sc_2O_3$, $Y_2O_3$, $TiO_2$, $ZrO_2$, $V_2O_5$, $Nb_2O_5$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, LiF, KF, and a combination thereof.

6. The method of claim 2, wherein the glass powder has an average particle diameter ranging from 0.1 to 5 μm.

7. The method of claim 2, wherein the glass powder has an average particle diameter ranging from 0.5 to 2 μm.

8. The method of claim 2, wherein the composition for the first dielectric layer comprises 50 to 70 wt % of the glass powder based on the total weight of the composition for forming the first dielectric layer.

9. The method of claim 2, wherein the composition for the first dielectric layer comprises 55 to 65 wt % of the glass powder based on the total weight of the composition for forming the first dielectric layer.

10. The method of claim 1, wherein the photosensitive composition for the second dielectric layer comprises:
   a glass powder;
   a photosensitive binder;
   a cross-linking compound having at least two ethylene-based double bonds;
   a photopolymerization initiator; and
   a solvent.

11. The method of claim 10, wherein the glass powder is at least one selected from the group consisting of ZnO, $B_2O_3$, $Al_2O_3$, $SiO_2$, SnO, $P_2O_5$, $Sb_2O_3$, $Bi_2O_3$ and a combination thereof.

12. The method of claim 10, wherein the glass powder is at least one selected from the group consisting of zinc oxide-boron oxide-silicon oxide (ZnO—$B_2O_3$—$SiO_2$), zinc oxide-boron oxide-silicon oxide-aluminum oxide (ZnO—$B_2O_3$—$SiO_2$—$Al_2O_3$), bismuth oxide-boron oxide-silicon oxide ($Bi_2O_3$—$B_2O_3$—$SiO_2$), bismuth oxide-boron oxide-silicon oxide-aluminum oxide ($Bi_2O_3$—$B_2O_3$—$SiO_2$—$Al_2O_3$), bismuth oxide-zinc oxide-boron oxide-silicon oxide ($Bi_2O_3$—ZnO—$B_2O_3$—$SiO_2$), bismuth oxide-zinc oxide-boron oxide-silicon oxide-aluminum oxide ($Bi_2O_3$—ZnO—$B_2O_3$—$SiO_2$—$_2O_3$), and a combination thereof.

13. The method of claim 10, wherein the glass powder further comprises at least one material selected from the group consisting of an oxide of a group 1 to group 5 metal element, an oxide of a lanthanum-based element, and a fluoride of a group 1 metal element.

14. The method of claim 10, wherein the glass powder further comprises at least one selected from the group consisting of $Na_2O$, $Li_2O$, $K_2O$, $Cs_2O$, MgO, CaO, SrO, BaO, $Sc_2O_3$, $Y_2O_3$, $TiO_2$, $ZrO_2$, $V_2O_5$, $Nb_2O_5$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, LiF, NaF, KF, and a combination thereof.

15. The method of claim 10, wherein the glass powder has an average particle diameter ranging from 0.1 to 5 μm.

16. The method of claim 10, wherein the glass powder has an average particle diameter ranging from 0.5 to 2 μm.

17. The method of claim 10, wherein the glass powder is included in an amount of 50 to 65 wt % based on the total weight of the photosensitive composition for forming the second dielectric layer.

18. The method of claim 10, wherein the glass powder is included in an amount of 55 to 60 wt % based on the total weight of the photosensitive composition for forming the second dielectric layer.

19. The method of claim 10, wherein the photosensitive binder is at least one selected from the group consisting of an acryl-based resin, a styrene resin, a novolac resin, and a polyester resin.

20. The method of claim 10, wherein the photosensitive binder is at least one selected from the group consisting of acrylic acid, methacrylic acid, maleic acid, fumaric acid, crotonic acid, itaconic acid, citraconic acid, mesaconic acid, cinamic acid, mono(2-(meth)acryloyloxyethyl)succinate, ω-carboxyl-polycaprolactone mono(meth)acrylate, 2-hydroxyethyl(meth)acrylate, 2-hydroxypropyl(meth)acrylate, 3-hydroxypropyl (meth)acrylate, o-hydroxystyrene, m-hydroxystyrene, p-hydroxystyrene, (meth)acrylic acid ester, an aromatic vinyl-based monomer, a conjugated diene, a macromonomer (polymer) having a polymerizable unsaturated group, and a combination thereof.

21. The method of claim 10, wherein the photosensitive binder has a number average molecular weight (Mn) ranging from 5,000 to 50,000.

22. The method of claim 10, wherein the photosensitive binder has an acid value ranging from 20 to 100 mg KOH/g.

23. The method of claim 10, wherein the photosensitive binder is included in an amount of 5 to 10 wt % based on the total weight of the photosensitive composition for the second dielectric layer.

24. The method of claim 10, wherein the photosensitive binder is included in an amount of 5 to 7 wt % based on the total weight of the photosensitive composition for the second dielectric layer.

25. The method of claim 10, wherein the cross-linking compound having at least two ethylene-based double bonds is at least one selected from the group consisting of an acrylate, a methacrylate, a mono-, di-, tri-, or more ester obtained by a reaction of a polybasic acid and hydroxy alkyl(meth)acrylate, and a combination thereof.

26. The method of claim 10, wherein the cross-linking compound having at least two ethylene-based double bonds is at least one selected from the group consisting of 1,4-butanedioldiacrylate, 1,3-butylene glycol diacrylate, ethylene glycol diacrylate, pentaerythrytol tetraacrylate, triethylene glycol diacrylate, dipentaerythrytol diacrylate, sorbitol triacrylate, a bisphenol A diacrylate derivative, trimethylol propane triacrylate, trimethylol propane triacrylate modified with ethylene oxide, dipentaerythrytol polyacrylate, 1,4-butanediol dimethacrylate, 1,3-butylene glycol dimethacrylate, ethylene glycol dimethacrylate, pentaerythrytol tetramethacrylate, triethylene glycol dimethacrylate, dipentaerythrytol dimethacrylate, sorbitoltrimethacrylate, bisphenol A dimethacrylate derivative, trimethylol propane trimethacrylate, trimethylol propane trimethacrylate modified with ethylene oxide, dipentaerythrytol polymethacrylate, a copolymer thereof, and a combination thereof.

27. The method of claim 10, wherein the cross-linking compound having at least two ethylene-based double bonds is included in an amount of 1 to 15 wt % based on the total weight of the photosensitive composition for the second dielectric layer.

28. The method of claim 10, wherein the cross-linking compound having at least two ethylene-based double bonds is included in an amount of 3 to 10 wt % based on the total weight of the photosensitive composition for the second dielectric layer.

29. The method of claim 10, wherein the photopolymerization initiator is at least one selected from the group consisting of benzoin, benzoin alkyl ethers, acetophenone-based compounds, aminoacetophenone, anthraquinone, thioxanthone, ketals, benzophenone, xanthone, triazine, imidazole, phosphineoxide, peroxides, and a combination thereof.

30. The method of claim 10, wherein the photopolymerization initiator is at least one selected from the group consisting of benzoin, benzoin methylether, benzoin ethylether, benzoin isopropylethyl, acetophenone, 2,2-dimethoxy-2-phenylacetophenone, 2,2-diethoxy-2-phenylacetophenone, 1,1-dichloroacetophenone, α-amino acetophenone, 2-methyl-1-[4-(methylthio)phenyl]-2-morpholinopropanone-1,2-benzyl-2-dimethylamino-1-(4-morpholinophenyl)-butanone-1,2-methylanthraquinone, 2-ethylanthraquinone, 2-t-butylanthraquinone, 2,4-dimethylthioxanthone, acetophenonedimethylketal, benzyldimethylketal, benzophenone, xanthone, triazine, imidazole, (2,6-dimethoxybenzoyl)-2,4,4-trimethylpentylphosphineoxide, bis (2,4,6-trimethylbenzoyl)-phenylphosphineoxide, 2,4,6-trimethylbenzoyldiphenylphosphineoxide, ethyl-2,4,6-trimethylbenzoylphenylphosphinate, and a combination thereof.

31. The method of claim 10, wherein the photopolymerization initiator is included in an amount of 0.1 to 8 wt % based on the total weight of the photosensitive composition for the second dielectric layer.

32. The method of claim 10, wherein the photopolymerization initiator is included in an amount of 0.3 to 5 wt % based on the total weight of the photosensitive composition for the second dielectric layer.

33. The method of claim 10, wherein the solvent is at least one selected from the group consisting of ketone, alcohol, ether-based alcohol, saturated aliphatic monocarboxylic acid alkyl ester, lactic acid ester, ether-based ester, and a combination thereof.

34. The method of claim 10, wherein the solvent is included in an amount of 4 to 30 wt % based on the total weight of the photosensitive composition for the second dielectric layer.

35. The method of claim 10, further comprising at least one additive selected from the group consisting of a sensitizer, a polymerization inhibitor, an oxidation inhibitor, an ultraviolet ray absorber, an antifoaming agent, a dispersing agent, a leveling agent, a plasticizer, and a combination thereof.

36. The method of claim 1, wherein the first green sheet and the second green sheet have a thickness ratio ranging from 3:1 to 4:1.

37. The method of claim 1, wherein the second green sheet has a thickness ranging from 5 to 30 μm.

38. The method of claim 1, wherein the exposing is performed with a photomask or by direct imaging.

39. The method of claim 1, wherein the developing is performed by spraying a base aqueous solution or by dipping in a base aqueous solution.

40. The method of claim 39, wherein the base aqueous solution comprises at least one base selected from the group consisting of lithium hydroxide, sodium hydroxide, potassium hydroxide, sodium hydrogen phosphate, diammonium hydrogen phosphate, dipotassium hydrogen phosphate, disodium hydrogen phosphate, ammonium dihydrogen phosphate, potassium dihydrogen phosphate, sodium dihydrogen phosphate, lithium silicate, sodium silicate, potassium silicate, lithium carbonate, sodium carbonate, potassium carbonate, lithium borate, sodium borate, potassium borate, ammonia, tetramethyl ammonium hydroxide, trimethyl hydroxyl ethyl ammonium hydroxide, monomethylamine, dimethylamine, trimethylamine, monoethylamine, diethylamine, triethylamine, monoisopropylamine, diisopropylamine, ethanolamine, and a combination thereof.

41. The method of claim 39, wherein the base aqueous solution has a concentration of 0.1 to 1%.

42. The method of claim 39, wherein the base aqueous solution has a temperature ranging from 25° C. to 55° C.

43. The method of claim 1, further comprising, after the developing, rinsing or performing neutralization with acid to remove unnecessary development solution.

44. The method of claim 1, wherein the firing is performed at a temperature of 480° C. to 620° C.

45. The method of claim 1, further comprising forming a protection layer to cover the dielectric layer after forming the dielectric layer on the patterned display electrode.

46. The method of claim 45, wherein the protection layer comprises at least one layer selected from the group consisting of a fluoride layer and an oxide layer.

47. The method of claim 45, wherein the protection layer comprises at least one layer selected from the group consisting of $MgF_2$, $CaF_2$, LiF, MgO, $Al_2O_3$, ZnO, CaO, SrO, $SiO_2$, $La_2O_3$, and a combination thereof.

48. A method of making a plasma display panel, comprising:
    forming address electrodes on a front substrate;
    forming a green sheet on the address electrodes, the green sheet comprising a first dielectric layer and a second dielectric layer on the first dielectric layer, the second dielectric layer being a photosensitive dielectric layer;
    patterning the second dielectric layer by exposing, developing, and firing the second dielectric layer to form spaces for display electrodes and discharge cells;
    filling a composition for display electrodes in the spaces for the display electrodes and then firing to form patterned display electrodes;
    forming a third dielectric layer on the patterned display electrodes;
    forming patterned barrier ribs on a rear substrate;
    forming phosphor layers between the barrier ribs; and
    assembling the front substrate and the rear substrate followed by evacuating and sealing.

49. A green sheet for forming dielectric layers of a plasma display panel, comprising:
    a first green sheet made of a dielectric composition comprising at least one glass powder selected from the group consisting of ZnO, $B_2O_3$, $Al_2O_3$, $SiO_2$, SnO, $P_2O_5$, $Sb_2O_3$, and $Bi_2O_3$, the glass powder having an average particle diameter ranging from 0.1 to 5 μm; and
    a second green sheet formed on the first green sheet, the second green sheet made of a photosensitive dielectric composition.

* * * * *